US010602355B2

(12) United States Patent
Auvray et al.

(10) Patent No.: US 10,602,355 B2
(45) Date of Patent: Mar. 24, 2020

(54) DEVICE FOR ACCESSING A WIDE AREA NETWORK VIA A MOBILE COMMUNICATION NETWORK

(71) Applicant: ORANGE, Paris (FR)

(72) Inventors: Vincent Auvray, Octeville (FR); Aymeric De La Forest Divonne, Carpiquet (FR)

(73) Assignee: ORANGE, Paris (FR)

(*) Notice: Subject to any disclaimer, the term of this patent is extended or adjusted under 35 U.S.C. 154(b) by 568 days.

(21) Appl. No.: 15/301,628

(22) PCT Filed: Mar. 27, 2015

(86) PCT No.: PCT/FR2015/050803
§ 371 (c)(1),
(2) Date: Oct. 3, 2016

(87) PCT Pub. No.: WO2015/150675
PCT Pub. Date: Oct. 8, 2015

(65) Prior Publication Data

US 2017/0111793 A1 Apr. 20, 2017

(30) Foreign Application Priority Data

Apr. 2, 2014 (FR) ..................................... 14 52904

(51) Int. Cl.
*H04W 12/06* (2009.01)
*H04W 88/06* (2009.01)
(Continued)

(52) U.S. Cl.
CPC .......... *H04W 12/06* (2013.01); *H04B 1/3816* (2013.01); *H04L 63/083* (2013.01);
(Continued)

(58) Field of Classification Search
CPC ... H04L 12/14; H04L 29/06068; H04L 63/08; H04L 63/0853; H04L 63/10;
(Continued)

(56) References Cited

U.S. PATENT DOCUMENTS

2011/0294502 A1* 12/2011 Oerton .................. H04W 72/10 455/426.1
2013/0139221 A1* 5/2013 Gundavelli ........... H04W 12/06 726/4

(Continued)

FOREIGN PATENT DOCUMENTS

EP 2391179 A1 11/2011
EP 2670171 A1 12/2013

OTHER PUBLICATIONS

Written Opinion of the International Searching Authority dated Jun. 22, 2015, for corresponding International application No. PCT/FR2015/050803, filed Mar. 27, 2015.

(Continued)

*Primary Examiner* — Theodore C Parsons
(74) *Attorney, Agent, or Firm* — David D. Brush; Westman, Champlin & Koehler, P.A.

(57) ABSTRACT

A device for accessing a wide area network via a mobile communication network. The device includes a first connection module for connection to the mobile communication network, a second connection module suitable for generating a local network, a data processing module and a subscriber identification card. The data processing module is configured to connect the first and second connection modules via a channel. The subscriber identification card is configured to implement a control module suitable for controlling the use of the channel.

10 Claims, 3 Drawing Sheets

1 2 3 4 12
WiFi Interface
Mobile Interface
Orange Network
Hotspot manager
TUN interface
Access controller
MSP app UI

(51) Int. Cl.

| | |
|---|---|
| ***H04W 8/18*** | (2009.01) |
| ***H04W 48/18*** | (2009.01) |
| ***H04W 12/08*** | (2009.01) |
| ***H04L 29/06*** | (2006.01) |
| ***H04B 1/3816*** | (2015.01) |
| *H04W 88/10* | (2009.01) |
| *H04W 12/00* | (2009.01) |

(52) U.S. Cl.
CPC ...... *H04L 63/0853* (2013.01); *H04L 63/0876* (2013.01); *H04W 8/183* (2013.01); *H04W 12/08* (2013.01); *H04W 48/18* (2013.01); *H04W 12/00403* (2019.01); *H04W 88/06* (2013.01); *H04W 88/10* (2013.01)

(58) Field of Classification Search
CPC .. H04L 63/083; H04L 63/0876; H04W 12/06; H04W 12/08; H04W 76/10; H04W 48/18; H04W 8/183; H04W 88/06; H04W 88/10; H04B 1/3816
See application file for complete search history.

(56) References Cited

U.S. PATENT DOCUMENTS

2013/0316672 A1* 11/2013 Nousiainen ............ H04W 4/24 455/406
2014/0165170 A1* 6/2014 Dmitriev ................ H04L 63/08 726/7

OTHER PUBLICATIONS

International Search Report dated Jun. 22, 2015, for corresponding International Application No. PCT/FR2015/050803, filed Mar. 27, 2015.
International Preliminary Report on Patentability and English translation of the Written Opinion of the International Searching Authority dated Oct. 4, 2016, for corresponding International application No. PCT/FR2015/050803, filed Mar. 27, 2015.
Novatel Wireless, "MiFi—User Guide" pp. 1-108, Dec. 31, 2009, URL:http://www3.ipass.com/wp-content/uploads/2010/10/Novatel_MiFi_UserGuide.pdf, XP002615789.

* cited by examiner

DEVICE FOR ACCESSING A WIDE AREA NETWORK VIA A MOBILE COMMUNICATION NETWORK

CROSS-REFERENCE TO RELATED APPLICATIONS

This Application is a Section 371 National Stage Application of International Application No. PCT/FR2015/050803, filed Mar. 27, 2015, which is incorporated by reference in its entirety and published as WO 2015/150675 on Oct. 8, 2015, not in English.

GENERAL TECHNICAL FIELD

The present invention relates to a device for accessing a wide area network via a mobile communication network.

STATE OF THE ART

Many devices for accessing via a mobile communication network a wide area network, for example the internet network, are known. They notably allow to a user to continue to use internet in all his/her displacements.

These devices are currently called "3G/4G modem/router" (according to the technology of the mobile communication network to which they connect) and appear as a small size casing equipped with an internal antenna, an SIM card of an operator of the mobile communication network, and having a connection interface with a piece of equipment (to which the device provides access to internet), typically a portable computer. This sharing of connection is called "tethering".

This interface is most often a wired connection of the USB (Universal Serial Bus) type whence the 3G/4G "dongle" name often given to these devices, but it may also be a wireless connection WiFi and/or Bluetooth (the name of 3G/4G "hotspot" is then encountered). The modem generally accumulates several connectivities.

The wireless connection provides many advantages. In particular, the access to internet may be provided to a plurality of pieces of equipment, on the one hand, and the average range of the WiFi or Bluetooth makes it possible to move the device away so as to place it in a location where the reception of the wireless communication network is better (for example in height, away from any metal object, etc.)

The mobile terminals of the smartphone type increasingly often incorporate 3G/4G modem functionalities. Indeed, the smartphones have wireless communication means which may be configured into an access point (AP). Other terminals may thus connect thereto and share the 3G/4G link towards the internet.

Today, it is possible to use on these 3G/4G modems access control techniques such as "captive portals" which are found on Wi-Fi terminals of the access point type.

These techniques use a software brick (for example of the "CoovaChili" type) forcing the customers to display a special page (often requiring authentication, payment or simply acceptance of general conditions of use) before accessing the internet normally. This is for example obtained by intercepting all the packets regardless of their destinations until the user opens his/her web browser and attempts to access internet. The browser is then redirected towards a predetermined web page.

This gives the possibility of making access to internet paid by customers (for example if the device is installed in a hotel or a bar), monitoring the associated traffic (setting a data consumption limit), or further blocking abusive usage.

However, it is seen that the use of captive portals on such devices has security holes, in particular if the device is a smartphone configured in connection sharing. Indeed, the device is traditionally authenticated at a management server via a client called an access controller (for example according to the "RADIUS" protocol, Remote Authentication Dial-In User Service) which one knows how to circumvent, for example by means of a malicious piece of software installed on the device which would infect the client or which would intercept the data which it receives or emits.

The invention will improve the situation.

PRESENTATION OF THE INVENTION

The present invention thus relates according to a first aspect to a device for accessing a wide area network via a mobile communication network, comprising a first connection module for connecting to the mobile communication network, a second connection module adapted for generating a local network, a data processing module and a subscriber identification card, the data processing module being configured for connecting the first and the second connection module via a channel, the device being characterized in that the subscriber identification card is configured to implement a control module adapted for controlling the use of said channel.

In so far that a subscriber identification card of the SIM type is a security module for which access is reserved for very specific applications of the operator, the malicious pieces of software are no longer capable of fooling the access controller.

According to other advantageous and non-limiting features:

The device is a mobile terminal of the smartphone type. Indeed this is the type of device which may be subject to the installation of malicious applications;

said channel is a TUN interface.

TUN is particularly suitable for efficiently and reliably controlling the traffic between the first and the second connection module;

said control module implemented by the subscriber card is adapted for communicating in a secure way with a management server via the mobile communication network.

The fact that the SIM card also has on board an authentication client communicating with a remote server guarantees that the authentication is indisputable;

which said control module is a CoovaChili module.

This is a known module having been successfully tested and which may be loaded on the SIM card;

the control module implemented by the subscriber card is configured so as to communicate with the management server according to the Remote Authentication Dial-In User Service (RADIUS) protocol.

RADIUS guarantees ciphering of the data between the loaded client and the server, which ensures that the authentication data cannot be falsified.

According to a second aspect, the invention relates to a system comprising a device according to the first aspect of the invention, a management server and at least one piece of equipment connected to said local network.

According to a third aspect, the invention relates to a method for routing data through a device for accessing a wide area network via a mobile communication network, comprising a first module for connecting to the mobile communication network, a second connection module adapted for generating a local network, a data processing module and a subscriber identification card, the method being characterized in that it comprises performing by the subscriber identification card steps for:

(a) Receiving an activation request for a connection between the first and the second connection module;

(b) Generating a channel between the first and the second connection module in the data processing module;

(c) Receiving from a piece of equipment connected to said local network at least one piece of authentication information;

(d) Authenticating the piece of equipment depending on said piece of authentication information;

(e) Opening said channel if the piece of equipment is authenticated.

According to other advantageous and non-limiting features:

a management server is connected to the device via said mobile communication network, step (d) comprising the sending intended for the management server of an authentication request comprising said piece of authentication information, and receiving from the management server a response for validating or not the authentication.

This embodiment allows the application of the method with very little modification of the existing systems (in particular the SIM card);

a management server is connected to the device via said mobile communication network, step (d) comprising the receiving from the management server reference authentication information, and the comparison between at least one piece of authentication information received from the piece of equipment and said reference pieces of authentication information.

This embodiment allows increased security, since the authentication is directly achieved in the SIM card. Further, this embodiment discharges the server from this authentication step. The result of this is a decrease in the use of the physical and/or software resources on the management server and on the network which is inserted between the device and the management server.

an authentication page is stored on the subscriber identification card allowing input of pieces of identification information, step (c) comprising the transmission to the piece of equipment of said authentication page.

This gives the possibility of further more securing the captive portal techniques since the SIM card thus handles the integrality of the operations for input of the pieces of authentication information to their validation;

step (a) comprises the receiving and the verification of a personal identification number (PIN) of the subscriber identification card on a user interface of the device.

This input of the PIN code is an additional security provided by the user of the SIM card, step (b) comprises the closing of any link between the first and the second connection module in the data processing module other than the channel.

This prevents the use of other paths, and gives the possibility of using the present method with any existing hardware.

According to a fourth and a fifth aspect, the invention relates to a computer program product comprising code instructions for executing a method according to the third data routing aspect by a device for accessing a wide area network via a mobile communication network; and storage means which are legible by a piece of computer equipment on which a computer program product comprises code instructions for executing a method according to the third data routing aspect by a device for accessing a wide area network via a mobile communication network.

PRESENTATION OF THE FIGURES

Other features and advantages of the present invention will become apparent upon reading the description which follows of a preferential embodiment. This description will be given with reference to the appended drawings wherein.

DETAILED DESCRIPTION

Architecture

Figure 1:
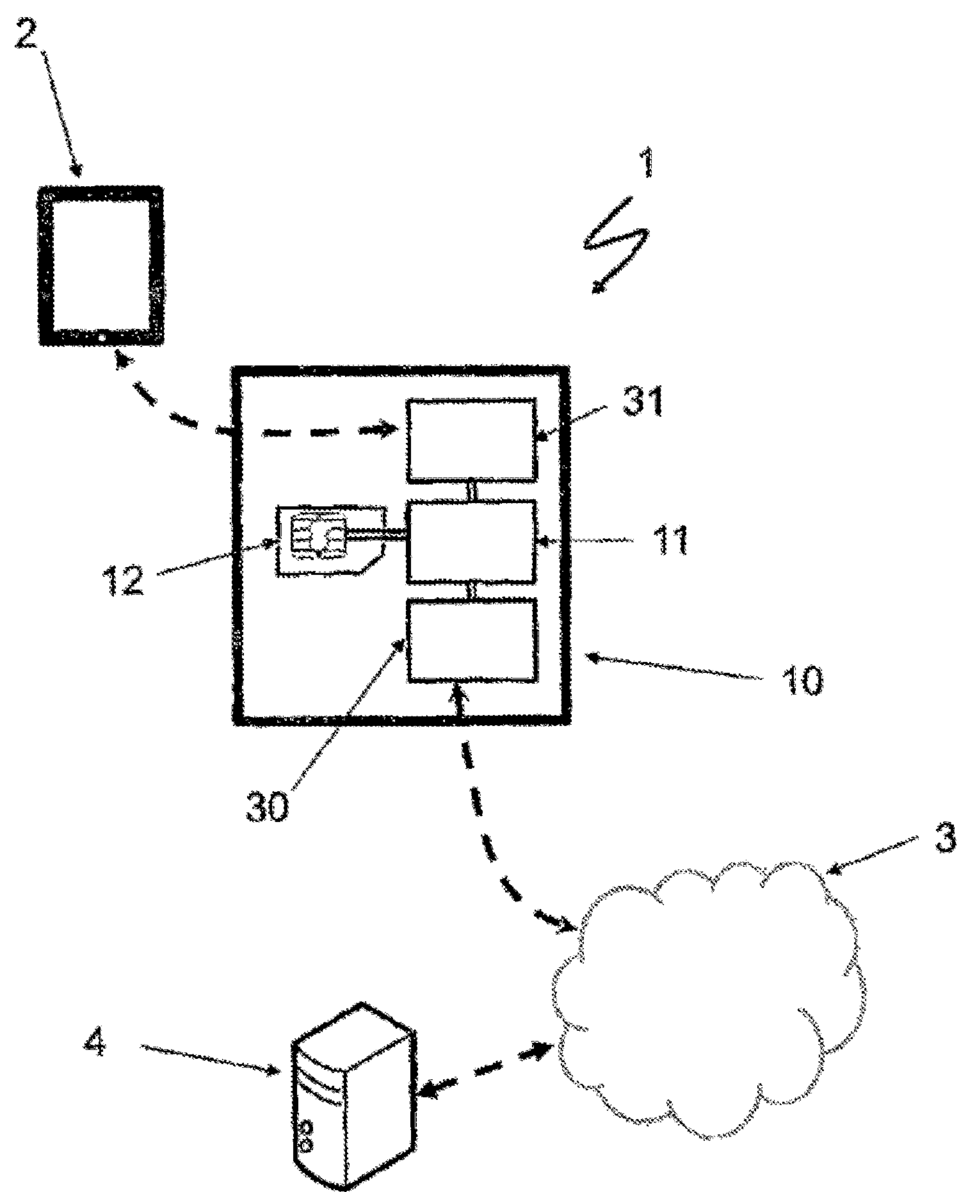
FIG. 1 is a diagram of the device for accessing a wide area network according to the invention.

The architecture of the present device 1 for accessing a wide area network via a mobile communication network 3 is illustrated with FIG. 1.

The extended network is a WAN (Wide Area Network) network, in particular the internet network (which will be taken as an example of a preferred WAN in the continuation of the present application). As explained earlier, this device 1 connects to a mobile communication network 3 on the one hand, typically a mobile telephone network of the 3G or 4G type connected to the WAN network (however it will be understood that the invention is not limited to any type of mobile communication network), on the one hand, and to one or several pieces of equipment 2 (in FIG. 1, a tactile tablet), on the other hand, to which it will provide access to the WAN (internet). The device 1 is advantageously a mobile terminal of the smartphone type, etc.

The device 1 comprises a casing 10 which hosts the electronic components of the device 1.

From among the latter, a data processing module 11 is found, a first connection module 30, a second connection module 31 and a subscriber identification card 12 of an operator of the mobile communication network 3. A battery may also be present.

By "subscriber identification card", is meant any integrated circuit capable of ensuring the functions for identifying a subscriber to a network via data which are stored therein, and most particularly a "SIM" (Subscriber Identity Module) card or an "e-UICC" (for "(embedded)-Universal Integrated Circuit Card") card comprising data processing means as a micro-controller and memory of the "EEPROM" (for "Electrically-Erasable Programmable Read-Only Memory"), or flash type. In the continuation of the present application, as an example, the subscriber identification card 2 will commonly be referred to as an SIM card, but it will be understood that the invention is not exclusively limited to this technology.

The data processing module 11, which for example assumes the form of a processor, ensures the modem functions of the device 1.

The first connection module 30 is a wireless connection module allowing connection to the mobile communication network 3.

This wireless connection module 30 is connected to the data processing module 11, itself connected to the second connection module 31 (which is also advantageously a wireless connection module, which may optionally coincide partly with the first wireless connection module 30, for example by sharing its antenna) and with the subscriber identification card 12.

The second connection module 31 is adapted for generating a local network, preferably a wireless local network. Subsequently in the present description, it will be assumed that each module 30, 31 is a wireless communication module, and the example of a Wi-Fi connection module will be assumed, but it will be understood that the invention is not limited to this technology (we for example think of Bluetooth). The connection may also be wired, even if a wireless network is preferred (since it allows several simultaneous connections). The piece of equipment 2 connects to this wireless local network via a specific wireless communication module.

Access Control

A management server 4 is connected to the mobile network 3 via the WAN network. This management server 4 is a platform of the "hotspot manager" type for controlling the provision of an access to the WAN to each piece of equipment 2 connected to the device 1. It gives the possibility of applying techniques of a "captive portal" mentioned earlier, by communicating with an access controller implemented on the device 1.

In particular, the access controller is capable of opening a channel between the first and second connection modules 30, 31 so as to control all the traffic exchange between both modules 30 and 31, and of blocking/redirecting it if necessary. In other words, the access controller is a module for controlling said channel, the use of which it controls. This channel may be understood as a "virtual tunnel" i.e. a software component (for example a TUN interface) simulating a physical peripheral (for routing on level 3 of the ISO) in the network core. More specifically, the channel ensures within the operating system encapsulation/de-encapsulation of data between the interface controlling the first connection module 30 (interface with the mobile network 3) and the interface controlling the second connection module 31, as if they were two physical network peripherals directly connected through a tunnel. It will thus be understood that the channel is actually a software element which gives the possibility of "sealing of" the communications between the first and the second module 30, 31.

The access controller is further configured so as to request from a piece of equipment 2 which wishes to access the WAN, pieces of authentication information such as an identifier (for example an MSISDN "Mobile Station ISDN Number" (i.e. a telephone number), an IMEI "International Mobile Equipment Identity", a MAC address "Media Access Control", etc.) and a password. It then generates (for example according to the mentioned RADIUS protocol) a connection request containing said pieces of authentication information. The server 4 processes the request and responds to the access controller by either authorizing or not connection. Depending on the response, the access controller either accepts or not the connection of the piece of equipment 2 to the WAN by either opening or not the channel between the first and the second connection modules 30, 31.

It should be noted that a plurality of exchanges between the client and the server 4 is sometimes necessary in order to either validate or not the connection of the piece of equipment 2 to the WAN.

Subscriber Identification Card

The device 1 is distinguished in that the access controller is implemented not by the processing module 11, but by the subscriber identification card 12. This gives the possibility of avoiding the achievement of the authentication in the kernel-space or the user space of the operating system of the device 1, wherein a malicious program may be installed (program corrupting the access controller so as to open the channel even without authentication).

Now, a subscriber identification card 12 is a trustworthy physical device which is quasi-impossible to hack (classified as a "secure element", i.e. a security module), since the installation of applications in these cards is limited to well-identified entities, and controlled by the operator.

Figure 2:
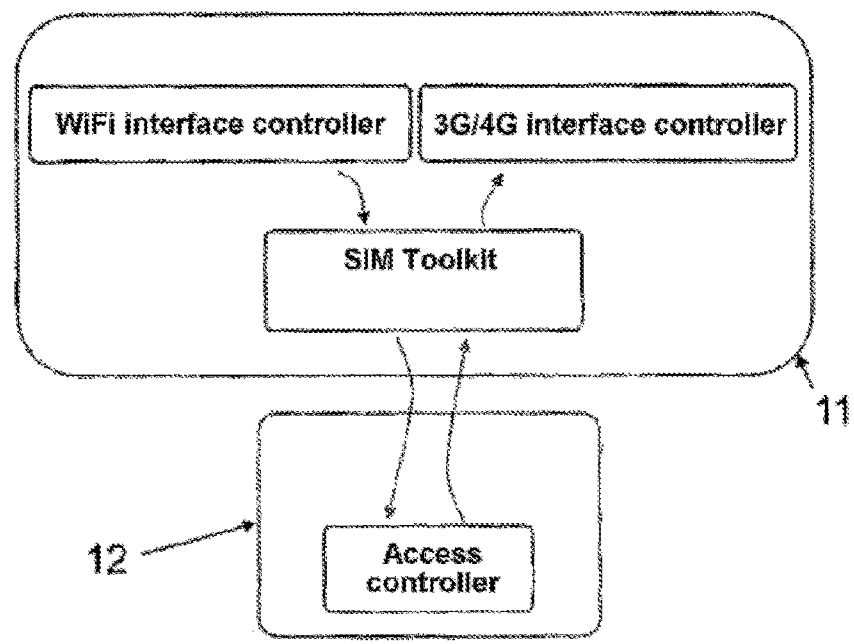
FIG. 2 illustrates a software architecture applied in the device according to the invention.

With reference to FIG. 2, the present device 1 thus isolates the access controller from the data processing means 11, which implement a "Sim Toolkit" (software communication module with the subscriber identification card), and the controllers of the Wi-Fi and mobile interfaces (in other words the interfaces respectively associated with the first and with the second connection modules 30, 31).

According to a second aspect, the invention relates to a system comprising the device 1 for accessing an extended WAN network (internet) via a mobile communication network 3 as described, the management server 4, and at least one piece of equipment 2 connected to the local network (Wi-Fi) generated by the second connection module 30. This system is illustrated with FIG. 1.

Method

Figure 3:
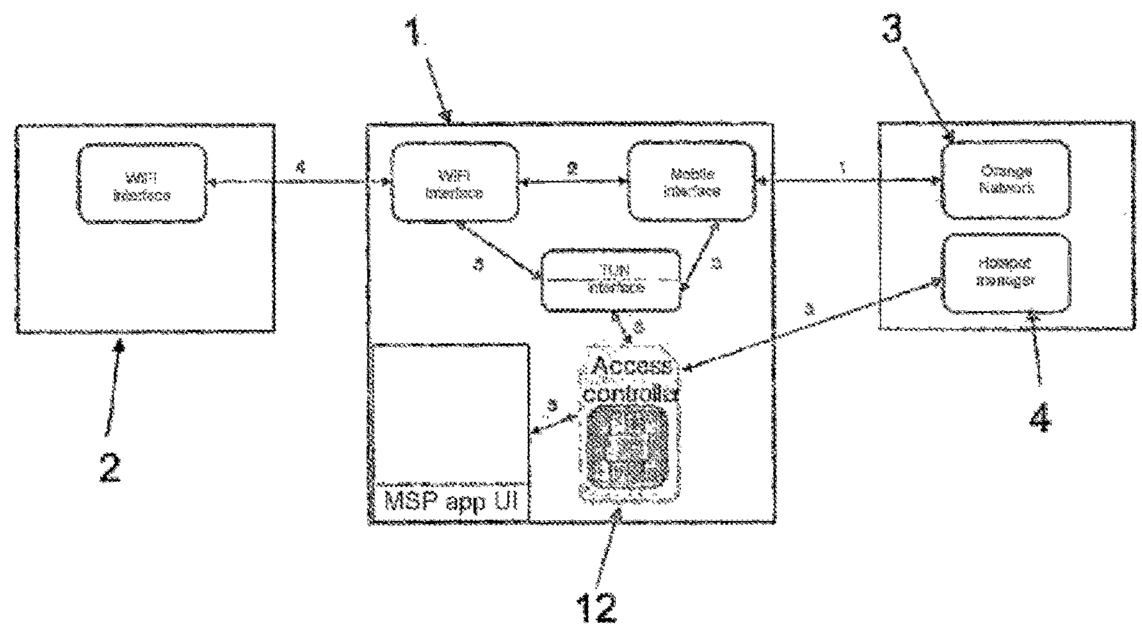
FIG. 3 illustrates an activation sequence of an internet connection by the device according to the invention.

According to a third aspect, a method for routing data through the device 1 for accessing an extended WAN network (internet) via a mobile communication network 3 is proposed. This method defines the sequence of steps performed by the subscriber identification card 12 giving the possibility to the piece of equipment 2 to access the WAN. In particular this is illustrated by FIG. 3, which represents in more detail an activation sequence of an internet connection by the device 1 (in the illustrated example, the device 1 is a mobile terminal implementing an application called "MSPapp" allowing this connection).

Preliminarily, the device 1 initiates connection to the mobile communication network 3 (via the first module 30), and activates tethering. This consists of starting the second module 31 (in order to generate the local network), and of defining a network configuration (starting a DHCP "Dynamic Host Control Protocol" server, of a DNS "Domain Name System" server, setting up a IP routing policy, etc.).

In a first step (a), the subscriber identification card receives an activation request from a connection between the first and second connection module 30, 31. This request may be transmitted subsequently to the launching of the aforementioned application MSPapp on device 1, and its execution may be subject to the input on a user interface (for example the screen of the smartphone) of a PIN code, i.e. a personal identification number, of the subscriber identification card 12. If the number is valid, the card processes the request.

At this stage, a link between the interfaces of the first and second connection modules 30, 31 may temporarily be generated in the operating system, but the first and second modules 30, 31 cannot yet communicate data with each other.

In a second step (b), a channel (TUN interface) is generated between the first and the second connection modules 30, 31 in the data processing module 11. Any other connection between these first and second connection modules 30, 31 is closed, so that any data packet has to pass through the channel. The latter for the moment is not yet open.

The access controller module implemented by the subscriber identification card 11 advantageously includes a RADIUS client, with which it will be able to converse with the remote management server 4 in order to achieve authentication of any piece of equipment 2 connected to the local network and wishing to access the WAN. The client receives from the piece of equipment 2 at least one piece of authentication information, preferably two including a unique identifier and a code. This step (c) may assume the form of a transmission to the piece of equipment 2 of an authentication page allowing the input of identification information (the "captive portal"), stored on the subscriber identification card 12.

This or these piece(s) of information allow in a step (d) the authentication (or not) of the piece of equipment 2. They may be sent intended for the management server 4 in an authentication request. The server processes the request for example by comparing the identifier with a list of identifiers in a white/black list, checked whether the code is valid, etc.

Alternatively, it is the subscriber identification card 12 which performs the comparison. For this, step (d) comprises the receiving from the management server 4 of reference pieces of authentication information. Generally, the server 4 may delegate to the subscriber identification card 12 the rights of access so that the latter manages the authentication.

It should be noted that it is even possible that there is no need of the server 4, if for example the reference pieces of authentication information are preloaded by the operator before the card 12 is provided to the user. This allows absolute security since the SIM card becomes self-contained.

In the most common case, where it is the server 4 which carries out the authentication (a solution which gives the possibility of displacing the majority of the computing power and of the required data), the server 4 sends back (after optionally several round trips if it needs other authentication information) a response either validating the authentication, or rejecting the authentication. It should be noted that all these exchanges between the controller module (within the card 12) and the server 4 pass in transit through the data processing module 11, and are then ciphered. In other words, if actually a malicious application was installed in the operating system, it will not be able to have an influence on the authentication since the processing module 11 is not capable of reading the data relating to the authentication which pass through it.

In the case of rejection of the authentication (piece of equipment 2 not authenticated), the access controller maintains the channel closed: the piece of equipment 2 cannot access the WAN. In the case of validation of the authentication (piece of equipment 2 authenticated), the access controller opens (at least partly) the channel so as to allow communication between the first and second modules 30, 31 (step (e)). Monitoring of the traffic may be performed so as to subsequently close the channel if for example a threshold is reached.

It should be noted that this method may be applied without any difficulties to existing terminals by changing the subscriber identification card and by performing an update of the operating system.

Computer Program Product

According to a fourth and fifth aspects, the invention relates to a computer program product comprising code instructions for executing (in particular on the subscriber identification card 12 of the device 1) a method according to the third aspect of the invention for routing data by the device 1, as well as of storage means legible by a piece of computer equipment (for example, a memory of the subscriber identification card 12 of the device 1) on which is found this computer program product.

The invention claimed is:

1. A device for accessing a wide area network via a mobile communication network, comprising:

a first connection module configured to connect to the mobile communication network, a second connection module configured to generate a local network, a data processing module configured to connect the first and the second connection modules via a channel, and a subscriber identification card configured to implement a control module adapted to open or not open access to said channel.

2. The device according to claim 1, wherein said control module implemented by the subscriber card is also adapted for communicating in a secure way with a management server via the mobile communication network.

3. A system comprising the device according to claim 2, the management server, and the piece of equipment connected to said local network.

4. A method comprising:

routing data through a device for accessing a wide area network via a mobile communication network, the device comprising a first module for connecting to the mobile communication network, a second connection module adapted for generating a local network, a data processing module and a subscriber identification card, wherein routing the data comprises the following acts performed by the subscriber identification card:

(a) receiving an activation request for a connection between the first and the second connection modules;

(b) generating a channel between the first and the second connection modules in the data processing module;

(c) receiving from a piece of equipment connected to said local network at least one piece of authentication information;

(d) authenticating the piece of equipment depending on said piece of authentication information or sending the piece of information to a management server for authentication; and (e) opening said channel if the piece of equipment is authenticated.

5. The method according to claim 4, wherein the management server is connected to the device via said mobile communication network, and act (d) comprises sending an authentication request comprising said piece of authentication information, intended for the management server, and receiving from the management server a response validating or not the authentication.

6. The method according to claim 4, wherein the management server is connected to the device via said mobile communication network, and act (d) comprises receiving from the management server reference pieces of authentication information, and comparing between said at least one piece of authentication information received from the piece of equipment and said reference pieces of authentication information.

7. The method according to claim 4, further comprising the subscriber identification card storing an authentication page allowing input of identification information, and act (c) comprises transmission to the piece of equipment of said authentication page.

8. The method according to claim 4, wherein act (a) comprises receiving and verification of a personal identification number (PIN) of the subscriber identification card on a user interface of the device.

9. The method according to claim 4, wherein act (b) comprises closing of any link between the first and the second connection module in the data processing module other than the channel.

10. A non-transitory computer-readable medium comprising a computer program product stored thereon, which includes code instructions for executing a method of routing data through a device for accessing a wide area network via a mobile communication network, when the code instructions are executed by a processor of a subscriber identification card, the device comprising a first module for connecting to the mobile communication network, a second connection module adapted for generating a local network, a data processing module and the subscriber identification card, wherein routing the data comprises the following acts performed by the subscriber identification card:

(a) receiving an activation request for a connection between the first and the second connection modules;

(b) generating a channel between the first and the second connection modules in the data processing module;

(c) receiving from a piece of equipment connected to said local network at least one piece of authentication information;

(d) authenticating the piece of equipment depending on said piece of authentication information; and (e) opening said channel if the piece of equipment is authenticated.

* * * * *